Aug. 8, 1939.    A. NAGEL    2,169,005

SHUTTER RELEASE FOR FOLDING CAMERAS

Filed May 1, 1937

August Nagel
INVENTOR.

BY

ATTORNEYS

Patented Aug. 8, 1939

2,169,005

UNITED STATES PATENT OFFICE 2,169,005

SHUTTER RELEASE FOR FOLDING CAMERAS

August Nagel, Stuttgart, Germany, assignor to Eastman Kodak Company, Rochester, N. Y., a corporation of New Jersey Application May 1, 1937, Serial No. 140,236
In Germany June 17, 1936

9 Claims. (Cl. 95—53)

This invention relates to photography, and particularly to a folding camera wherein the shutter which is of the setting type cannot be actuated by the shutter release which is mounted on the camera body until the shutter has been set.

One object of my invention is to provide a folding camera having a shutter of the setting type with a shutter actuating mechanism which cooperates with the shutter in such a way that the shutter release cannot be actuated until the shutter has been set. Another object is to provide a shutter actuating mechanism of the type referred to wherein the shutter release is mounted on the camera body remote from the shutter itself. And still another object is to provide a shutter actuating mechanism of the type referred to which is so constructed that no disconnection of its several parts is required when the camera is folded into its carrying position.

Briefly, the invention comprises a lever system which is movably mounted on the camera bed to be slid transversely thereof when pressure is applied axially to the shutter release which is mounted on the camera body. The forward end of the lever system comprises an articulated section which extends vertically from the camera bed, said section having two projections, one for engaging the shutter trigger when the shutter release is actuated, and the other for engaging the setting lever of the shutter when the same is not in its set position to prevent the actuation of the shutter release.

Figure 1:
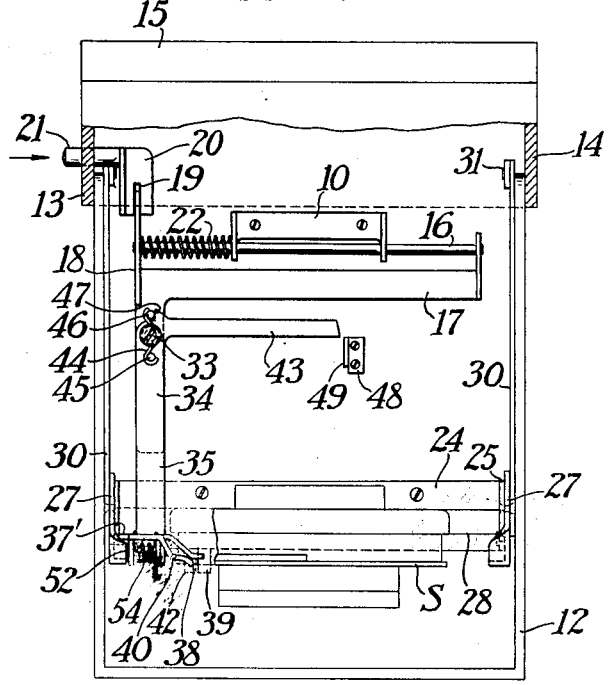
Figure 2:
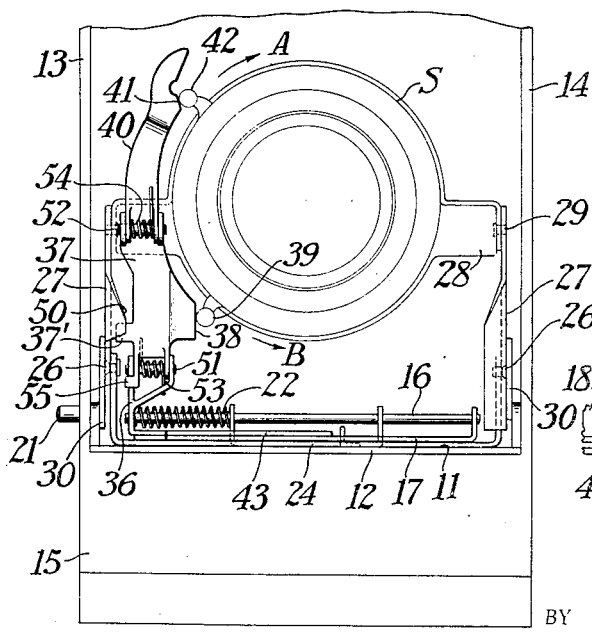
Figure 4:
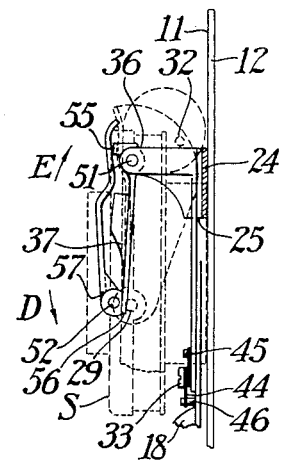
Figure 3:
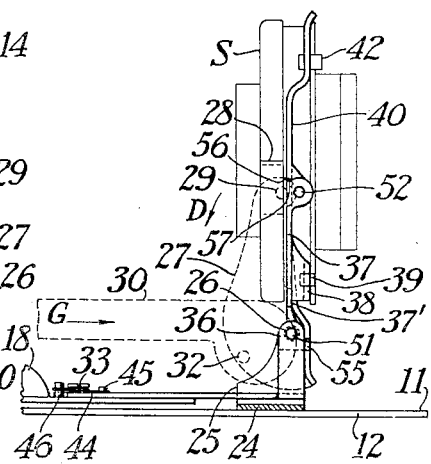

The novel features that I consider characterister of my invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a top plan view of a folding camera in open picture-taking position, with certain parts removed to more clearly show the shutter actuating mechanism, Fig. 2 is a partial front elevation of the camera in open picture-taking position with certain parts removed and showing in detail that portion of the shutter actuating mechanism engaging the shutter trigger and the setting lever, Fig. 3 is a partial side elevation of the camera, and showing the shutter and shutter actuating mechanism in picture-taking position, and Fig. 4 is a partial side elevation of the camera, showing the shutter and the shutter actuating mechanism in folded position.

Like reference characters refer to corresponding parts throughout the drawing.

As illustrated in the drawing, a bracket 10 is fixed to the rear end of the upper side 11 of the camera bed 12 which itself is hinged to the side walls 13 and 14 of the camera body 15. The bracket 10 carries and guides a rod 16 which is fixed to the slider 17 which in turn slides transversely of the camera bed 12. An arm 18 fixed to the slider 17 extends rearwardly of the camera bed 12 to engage a slot 19 in the lug 20 fixed to the end of the shutter release 21, said shutter release extending through the camera wall 13 and being slidably mounted with respect thereto. It will be understood that the particular connections shown between the arm 18 and the slider 17 and the lug 20 fixed to the shutter release 21 allow the camera bed 12 to be moved to its closed position without necessitating a break in the connection. The slider 17 and the shutter release 21 are normally forced to the left, looking at Fig. 1, or to their inoperative positions, by the action of the coil spring 22 which surrounds the rod 16 between the bracket 10 and the arm 18.

A shutter of the setting type S is foldably mounted in any known manner on the forward end of the camera bed 12. For the purpose of illustration only, I have shown a foldable mounting for the shutter S which includes a bracket 24 fixed to the forward end of the camera bed 12, and to the ears 25 of which are pivoted at 26 supports 27. A carrier plate 28 fixed to the shutter S is pivoted at 29 to the upper end of the support 27. A pair of levers 30, one on each side of the camera bed, which may constitute a portion of the bed brace, not shown, have one end pivoted to the camera body at 31 while their forward ends are pivoted at 32 to the lower end of the support 27. In the act of folding up the camera, the bed brace, not shown, is first broken and the bed is rotated about its hinge whereupon the levers 30 press upon the support 27 in the direction of the arrow G, and move the supports 27 about their pivots 26 and 29 to fold the shutter up to the position shown in Fig. 4 when the bed is folded up.

On the leg of the slider 17 which extends longitudinally of the camera bed, there is pivoted at 33 an angle shaped lever 34. The arm 35 of the lever 34 extends forwardly of the camera bed 12 and is provided with an upturned yoke end 36, see Fig. 2, which lies adjacent the shutter S. To the yoke end 36 is pivoted at 51 an actuating member 37 which has an engaging portion 38 for abutting the shutter trigger 39 when the lever system is moved transversely of the camera bed 12 by pressing the shutter release 21 in the direction of the arrow. Pivoted at 52 to the upper end of the actuating member 37 is a finger 40 the edge 41 of which is adapted to engage the setting lever 42 of the shutter when the same is not in its set position, see Fig. 2.

The lever 34 is normally held in a position wherein its arm 43 is parallel to the front edge of the camera bed by means of a spring 44 one end of which is fastened to a stud 45 on the lever while the other end is fastened to a stud 46 on the slider 17, said spring tending to rotate the lever 34 about the pivot 33 to a position wherein the shoulder 47 on the lever abuts the stud 46 on the slider 17. When the lever 34 is held in its normal position, the arm 43 thereof is adapted to pass over the top of the stop 48 on the camera bed 12 when the shutter release is pressed inwardly, a condition which depends upon the provision that the shutter is set by moving the setting lever 42 in the direction of the arrow A wherein the shutter is set.

If the shutter has been previously set, a pressure on the shutter release in the direction of the arrow will be transmitted to the lever system including slider 17, lever 34, actuating member 37, and finger 40; and an actuation of the shutter trigger 39 will be effected. The strength of the spring 44 is sufficient to hold the lever 34 in its normal position against the slight resistance encountered in actuating the shutter trigger, and the arm 43 of the lever 34 will pass over the top of the stop 48 and will be supported thereby.

If, on the other hand, the shutter release is pressed without first setting the shutter, the engaging edge 41 of the finger 40 engages the setting lever 42, see Fig. 1, which sets up a resistance sufficient to overcome the spring 44 whereby the lever 34 will be rotated about its pivot 33. When the lever 34 is rotated about its pivot 33, the end of the arm 43 whereof will abut the edge 49 of the stop 48 and will positively prevent the shutter release 21 from being actuated. When this condition arises, the operator is reminded that the shutter has not been set, and releases the shutter release 21 to set the shutter by moving the setting lever 42 in the direction of the arrow A and out of the path of the finger 40.

Owing to the effect of the springs 22 and 44, the slider 17 and the lever 34 again assume their normal positions when the shutter release 21 is freed. If the shutter release 21 is pressed again, then the yoke 36 of the lever arm 35 carries with it the actuating member 37, and the finger 40 against the action of the spring 44. The actuating member 37 with its engaging portion 38 presses the shutter trigger 39, and moves it in a direction of the arrow B, thereby releasing the shutter. After the shutter is actuated the shutter release 21 is freed and the slider 17 and the lever 34 revert to their original positions wherein the setting lever 42 lies in contact with the edge 41 of the finger 40, see Figs. 1 and 2, to prevent actuation of the shutter release until the shutter is set, as described above.

The actuating member 37 is provided with a projection 37' which engages the rear side 50 of one of the supports 27 when the shutter is in its picture-taking position, see Fig. 2, and the finger 40 pivoted thereto is situated so that it lies in front of but against the carrier plate 28.

Due to the relative location of the actuating member 37 and the finger 40 with respect to the foldable mounting of the shutter S, when the camera is closed the actuating member 37 is carried rearwardly with the support 27 when it pivots about the pivot point 26, in the direction of the arrow D, and the finger 40 is pivoted forward by the carrier plate 28 when the latter pivots about the point 29 in the direction as indicated by the arrow E; and the final position as shown in Fig. 4 is arrived at when the bellows, not shown, are folded up. The folding action is quite smooth because the pivot points 26 and 29 of the shutter mounting lie in line with the pivot points 51 and 52 of the actuating member 37 and finger 40 respectively.

The springs 53 and 54 serve to bring the actuating member 37 and the finger 40 automatically into the ready-for-use position, Figs. 1-3, when the bed 12 and the shutter S are brought to their picture-taking positions, whereby the shoulder 55 engages the yoke end 36 to serve as a stop for the actuating member 37, and the edge 56 engages the actuating member 37 at 57 to act as a stop for the finger 40.

Having thus described my invention what I declare is new and desire to secure by Letters Patent of the United States is:

1. In a folding camera the combination of a camera body, a bed carried by said camera body, a shutter of the setting type carried by said bed, a setting lever on said shutter, a trigger on said shutter, a shutter release movably mounted on the camera body, an inter-connecting means movably mounted on the camera bed to operably connect the shutter release and the shutter trigger, said inter-connecting means including a member adapted to abut said setting lever when the same is not in its set position, and means for positively preventing the actuation of said shutter release prior to the setting of the shutter, which means becomes effective when said member abuts the setting lever.

2. In a folding camera the combination of a camera body, a bed carried by said camera body, a shutter of the setting type carried by said bed, a setting lever on said shutter, a trigger on said shutter, a shutter release movably mounted on the camera body, and an inter-connecting means movably mounted on the camera bed to operably connect the shutter release and the shutter trigger, said inter-connecting means including a member adapted to abut the setting lever when the latter is not in its set position, whereby the shutter release can not be actuated until the shutter is set.

3. In a folding camera, the combination of a camera body, a bed hinged to said camera body, a shutter of the setting type foldably mounted on said bed, a trigger on said shutter, a setting lever on said shutter, a shutter release on the camera body, a linkage movably mounted on the camera bed to operably connect the shutter release and the shutter trigger when the shutter is brought to its picture taking position, said linkage including a system of levers slidably mounted on the camera bed and having one end connected with the shutter release and the other end extending into the path of the shutter trigger, and a finger connected with the free end of the lever system to move therewith, said finger being adapted to abut the setting lever when the same is not in its set position whereby the shutter release can not be actuated until the shutter is set.

4. In a folding camera, the combination of a camera body, a bed hinged to said camera body, a shutter of the setting type foldably mounted on said bed, a trigger on said shutter, a setting lever on said shutter, a shutter release on the camera body, and a linkage operably connecting said shutter release with said shutter when the shutter is brought to its picture taking position, said linkage including a system of levers movably mounted on the camera bed and adapted to extend longitudinally thereof so that one end is in the path of the shutter trigger, the other end of said lever system connected with the shutter release in such a way that a rotation of the bed upon its hinge does not break the connection between the two, and means for preventing the actuation of the shutter release until the shutter is set.

5. In a folding camera, the combination of a camera body, a bed hinged to said camera body, a shutter of the setting type foldably mounted on said bed, a trigger on said shutter, a setting lever on said shutter, a shutter release on the camera body, a linkage movably mounted on the camera bed to operably connect the shutter release and the shutter trigger but to prevent the actuation of said shutter release until the shutter is set, said linkage including a lever system slidably mounted on the camera bed and extending longitudinally thereof, one end of said lever system being connected to the shutter release to be moved thereby, the other end extending into proximity with the shutter trigger, an actuating member pivotally mounted on the free end of the lever system and extending into the path of the shutter trigger to actuate the latter when the shutter release is moved, and a finger pivotally mounted on the actuating member to move therewith, said finger being adapted to abut the setting lever when it is not in its set position to prevent the actuation of the shutter release until the shutter is set.

6. In a folding camera the combination of a camera body, a bed carried by said camera body, a stop on said bed, a shutter of the setting type foldably mounted on said bed, a trigger on said shutter, a setting lever on said shutter, a shutter release movably mounted on the camera body, and a linkage slidably mounted on said bed to operably connect the shutter release and the shutter trigger, said linkage including a finger adapted to abut the setting lever when the latter is not in its set position, and having a part rotatable with respect to the camera bed to engage the stop on said bed when the finger abuts the setting lever, whereby the shutter release cannot be actuated until the shutter is set.

7. In a folding camera, the combination of a camera body, a bed hinged to said camera body, a shutter of the setting type foldably mounted on said bed, a trigger on said shutter, a setting lever on said shutter, a shutter release on the camera body, a linkage movably mounted on the camera bed to operably connect the shutter release and the shutter trigger but to prevent the actuation of said shutter release until the shutter is set, said linkage including a slide slidably mounted on the camera bed and connected to the shutter release to be actuated thereby, an angle member pivotally mounted on said slide and resiliently held so that normally the main arm thereof extends longitudinally of the camera bed into proximity with the shutter and the other arm thereof extends in the direction of movement of the slide, a stop member mounted on the camera bed adjacent the arm of the angle member extending in the direction of movement of the slide but not in the normal path of movement thereof, an actuating member pivotally mounted on the end of the arm extending into proximity with the shutter, said actuating member extending into the path of the shutter trigger to actuate the latter when the shutter release is moved, and a finger pivotally mounted on the actuating member to move therewith, said finger being adapted to abut the setting lever when it is not in its set position whereby the angle member is rotated about its pivot and its arm extending in the direction of movement of the slide abuts the stop member to prevent actuation of the shutter release.

8. In a folding camera, the combination of a camera body, a bed hinged to said camera body, a shutter of the setting type foldably mounted on said bed, a trigger on said shutter, a setting lever on said shutter, a shutter release on the camera body, a linkage movably mounted on the camera bed to operably connect the shutter release and the shutter trigger when the shutter is brought to picture taking position but adapted to prevent actuation of the shutter release until the shutter is set, said linkage including a lever system slidably mounted on the camera bed and extending longitudinally thereof, one end of said lever system being connected to the shutter release to be moved thereby, the other end of the lever system extending into proximity with the shutter, an actuating member pivoted to the free end of the lever system to fold rearwardly of the camera bed as the camera is closed and adapted in its operative position to extend into the path of the shutter trigger to actuate the same when the shutter release is actuated, a finger pivotally mounted on the end of the actuating member to fold forwardly thereupon when the camera is closed and adapted to its operative position to abut the setting lever when the same is not in its set position whereby the shutter release can not be actuated until the shutter is set.

9. In a motion picture camera the combination of a camera body, a bed hinged to said camera body, a shutter of the setting type foldably mounted on the forward end of said camera bed, a trigger on said shutter, a setting lever on said shutter, a shutter release movably mounted on the camera body, and a linkage slidably mounted on the bed to operably connect the shutter release with the shutter trigger and setting lever whereby the shutter release cannot be actuated until the shutter is set, said linkage including an articulated portion adapted to fold upon itself when the shutter is folded to its inoperative position and to automatically assume its operating position when the shutter is brought to picture taking position.

AUGUST NAGEL.